United States Patent
Pfaff et al.

(10) Patent No.: US 6,997,982 B2
(45) Date of Patent: Feb. 14, 2006

(54) PIGMENT WITH A METALLIC LUSTER

(75) Inventors: Gerhard Pfaff, Münster (DE);
Stephanie Andes, Hanau (DE);
Michael Uhlig, Darmstadt (DE)

(73) Assignee: Merck Patent GmbH, Darmstadt (DE)

(*) Notice: Subject to any disclaimer, the term of this patent is extended or adjusted under 35 U.S.C. 154(b) by 0 days.

(21) Appl. No.: 10/493,408

(22) PCT Filed: Sep. 27, 2002

(86) PCT No.: PCT/EP02/10863

§ 371 (c)(1),
(2), (4) Date: Apr. 22, 2004

(87) PCT Pub. No.: WO03/037992

PCT Pub. Date: May 8, 2003

(65) Prior Publication Data

US 2004/0237844 A1    Dec. 2, 2004

(30) Foreign Application Priority Data

Oct. 27, 2001 (DE) ............................... 101 53 197

(51) Int. Cl.
C09C 1/62 (2006.01)
C09C 1/36 (2006.01)
C09C 1/22 (2006.01)
C04B 14/00 (2006.01)

(52) U.S. Cl. .................... 106/415; 106/403; 106/404; 106/431; 106/436; 106/439; 106/456; 106/454

(58) Field of Classification Search ............... 106/403, 106/404, 415, 417, 436, 431, 439, 453, 454, 106/456
See application file for complete search history.

(56) References Cited

U.S. PATENT DOCUMENTS

| 6,267,810 | B1 | 7/2001 | Pfaff et al. | |
| 6,325,847 | B1 * | 12/2001 | Christie et al. | ............. 106/417 |
| 6,440,208 | B1 * | 8/2002 | Christie et al. | ............. 106/415 |
| 6,517,628 | B1 | 2/2003 | Pfaff et al. | |
| 2002/0056399 | A1 | 5/2002 | Schoen et al. | |
| 2004/0244640 | A1 | 12/2004 | Voyt et al. | |

FOREIGN PATENT DOCUMENTS

| EP | 0353544 | | 2/1990 |
| EP | 0960914 | | 12/1999 |
| EP | 1045014 | | 10/2000 |
| WO | WO 93/08237 | * | 4/1993 |
| WO | WO 0140383 | | 6/2001 |

OTHER PUBLICATIONS

Database CA 'Online? Chemical Abstracts Service, Columbus, Ohio, US; Watanabe, Akira et al: "Pigment composition having metal luster" retrieved from STN Database accession No. 84:46195 CA XP002227100, 1976, no month.
Ito S et al: "Nickel coating on to glass flakes" World Surface Coatings Abstracts, (Paint Research Ass.) Pergamon Press Ltd. Oxford, GB, Bd. 69, Nr. 654 Dec. 1, 1996 XP000682401.

* cited by examiner

*Primary Examiner*—J. A. Lorengo
*Assistant Examiner*—Patricia L. Hailey
(74) *Attorney, Agent, or Firm*—Millen, White, Zelano, Branigan, P.C.

(57) ABSTRACT

The invention relates to a pigment with a metallic luster, comprising a plate-like non-metallic substrate having a thickness lower an 200 nm, which is entirely coated with a metallic layer.

16 Claims, No Drawings

PIGMENT WITH A METALLIC LUSTER

The invention relates to an effect pigment consisting of a platelet-shaped, non-metallic substrate and a metal layer which completely surrounds the substrate. The invention furthermore relates to a process for the preparation of the pigment and to the use thereof.

Metal-effect pigments have been employed for decades in coatings for producing the metal effect. They consist of platelet-shaped metal particles whose optical effect is based on directed reflection at the metal particles, which predominantly have a flat shape and are aligned parallel in the respective application medium.

For historical reasons, metal-effect pigments are frequently also known as "bronzes". However, they are not bronzes in the metallurgical sense, but aluminium pigments (silver bronzes), copper and copper/zinc pigments (gold bronzes) and zinc pigments (Roempp Lexikon—Lacke und Druckfarben [Roempp Lexicon—Paints and Printing Inks], Georg Thieme Verlag 1998, p. 378).

The main areas of application of metal-effect pigments are the automobile and printing industries. In addition, they are also employed for colouring plastics and paints, for leather coatings, in cosmetics and in the ceramic industry. In the car paints area, they are used mainly for producing the metallic effect, where they are usually applied together with other pigments, such as pearlescent pigments, titanium dioxide, carbon black or organic pigments, in the paint.

The term metallic or metal effect is applied to an effect which is caused, for example, in paints, printing inks and plastics by reflection of the light at platelet-shaped metal particles. The criteria for this effect are the brilliance (sparkle effect), the flop (brightness flop), the distinctness of image (DOI), the metallic tinting strength and the hiding power. The metal effect is dependent on the form factor (ratio of mean particle diameter to mean particle thickness) of the pigments and on the quality of the pigment surface, the particle size, the particle size distribution and in particular on the pigment orientation parallel to the surface in the paint or printing-ink film. Relatively large particles result in an increased glitter effect due to increased light reflection, while relatively small particles cause a higher hiding power.

In addition, there is a demand for pigments which provide the application systems, such as paints, plastics and print products, with an appearance which is comparable with the surface of liquid metals. This desired effect is also known as the "liquid metal effect".

Traditional aluminium pigments, which are prepared by mechanical processes starting from aluminium powder, do not meet these requirements.

Depending on the starting material and grinding method, non-uniform aluminium platelets having a high scattering content or rather round aluminium platelets are obtained. The round platelets (so-called silver dollars) can be employed for achieving improved metallic lustre effects owing to their low scattering content. Silver dollars are available, for example, under the name Stapa® Metallux 2000 from Eckart.

A further development is the particularly thin aluminium platelets described in greater detail in U.S. Pat. No. 3,949,139 and U.S. Pat. No. 4,321,087, which are prepared via PVD (physical vapour deposition) methods. Whereas conventional aluminium pigments have platelet thicknesses of greater than 100 nm, PVD pigments, for example the Metallure® grades from Eckart, have thicknesses of significantly less than 100 mm. The PVD aluminium pigments enable improved lustre effects to be achieved compared with the conventional aluminium pigments (J. Seubert, High Performance Pigments Conference, Miami Beach, 1999).

However, their use requires very specific applicational know-how in order to achieve reproducible effects. Otherwise, problems occur during application of the pigments. Thus, as a consequence of their low mechanical stability, they can only be subjected to low shear forces during incorporation into application systems, for example paints or plastics. In addition, their use in water-based application systems is problematic owing to the large reactive surface due to production. For certain applications, they are moreover not suitable at all, for example for powder coating.

The object of the invention is therefore to provide a pigment which can be employed in all application systems, such as paints, plastics and print products, and provides these with the appearance of liquid metals without having the above-mentioned disadvantages of PVD aluminium pigments.

This object is achieved in accordance with the invention by a pigment comprising a platelet-shaped, non-metallic substrate having a thickness of less than 200 nm which is completely surrounded by a metal layer.

This object is furthermore achieved by a process for the preparation of the pigment by suspending the substrate in an aqueous and/or solvent-containing medium in the presence of a metal compound, and, after addition of a reducing agent, depositing the metal layer on the substrate.

This object is furthermore achieved by a process for the preparation of the pigment by coating the substrate, fluidised in a fluidised bed, with metals obtained by gas-phase decomposition of the corresponding volatile metal compounds.

Finally, this object is achieved by a process for the preparation of the pigment by depositing the corresponding metals on the substrate in a high vacuum by sputtering or thermal evaporation, with the substrate being kept uniformly in motion during the coating operation.

The invention furthermore relates to the use of the pigments according to the invention in paints, surface coatings, printing inks, plastics, cosmetic formulations, ceramic materials, glasses, paper, for the laser marking of plastics, in security applications and in dry preparations and pigment preparations.

The substrates employed for the pigments according to the invention are platelet-shaped, non-metallic materials which have a particularly smooth surface and whose thickness is less than 200 nm, preferably less than 150 nm. Preference is given here to monocrystals of aluminium oxide, bismuth oxide chloride and basic lead carbonate, as well as $SiO_2$ flakes and $TiO_2$ flakes, but also glassflakes. Particular preference is given to aluminium oxide and bismuth oxide chloride, since both have extremely smooth surfaces and can be prepared inexpensively.

The $SiO_2$ flakes are prepared, for example, as described in International Application WO 93/08237 by hydrolysis of a water-glass solution on a continuous belt. The $TiO_2$ flakes can be prepared, for example, by the process described in WO 97/43346.

Monocrystalline bismuth oxide chloride substrates are prepared by controlled precipitation reaction from aqueous bismuth salt solutions. The size, thickness and crystal form can be influenced by the precipitation conditions and the addition of specific additives. Bismuth oxide chloride is itself a pigment and has been commercially available for some time.

Substrates of aluminium oxide can likewise be prepared by various known processes, as described, for example, in JP-A-57-111239, JP-A-04-39362 or JP-B-03-72527.

Preference is given to the aluminium oxide substrates disclosed in U.S. Pat. No. 5,702,519, which, besides a main component of $Al_2O_3$, also comprise a small proportion of titanium oxide. However, particular preference is given to the substrates known as alumina flakes, whose preparation is described in Eur. Coat. J., April 1999, pp. 90–96.

As glassflakes, all kinds of glassflakes having different compositions and being produced by usual methods are applicable, as long as they possess the thickness required.

The size of the substrate particles is not crucial per se. The mean diameter is usually in the range from 1 to 250 $\mu$m, preferably from 2 to 200 $\mu$m and in particular from 5 to 50 $\mu$m.

The form factor of the substrate particles is greater than 20 and preferably between 50 and 300.

For the metal layer surrounding the substrate, suitable metals are those which have a particularly strong reflection capacity. Preference is given to aluminium, titanium, chromium, nickel, silver, zinc, molybdenum, tantalum, tungsten, palladium, copper, gold, platinum and alloys comprising these, for example Hastelloy. Particular preference is given to aluminium and silver.

The thickness of the metal layer is between 10 and 100 nm. It is preferably set to from 20 to 50 nm.

The metal layer can be applied by known wet-chemical methods by reduction of inorganic or organic metal compounds. However, it can also be deposited by a CVD (chemical vapour deposition) method, for example gas-phase decomposition of metal carbonyls, or by a PVD method, for example by sputtering or vapour deposition of metals.

In the case of wet-chemical deposition of the metal layer, the substrate is suspended in an aqueous and/or solvent-containing medium in the presence of a metal compound, and, after addition of a reducing agent, the metal is deposited on the substrate. The metal compound can be an inorganic compound, for example silver nitrate, or an organometallic compound, for example nickel acetylacetonate. The solvent to be used is determined by the solubility of the organometallic compound.

The process described in U.S. Pat. No. 3,536,520 uses nickel chloride in the aqueous phase, with the substrate (mica) being subjected to pre-treatment with tin chloride and palladium chloride. The reducing agent used is hypophosphite.

In EP 0 353 544, the reducing agents for the wet-chemical metal deposition are reducing compounds, such as aldehydes (formaldehyde, acetaldehyde or benzaldehyde), ketones (acetone), carboxylic acids and salts thereof (tartaric acid or ascorbic acid), reductones (isoascorbic acid, triose reductone or reductic acid) and reducing sugars (glucose). However, it is also possible to use reducing alcohols (allyl alcohol), polyols and polyphenols, sulfites, hydrogensulfites, dithionites, hypophosphites, hydrazine, boron nitrogen compounds, metal hydrides and complex hydrides of aluminium and boron.

The deposition of the metal layer can furthermore be carried out with the aid of a CVD method. Methods of this type are known. Fluidised-bed reactors are preferably employed for this purpose. EP 0 741 170 describes the deposition of aluminium layers by reduction of alkylaluminium compounds using hydrocarbons in a stream of inert gas. The metal layers can furthermore be deposited by gas-phase decomposition of the corresponding metal carbonyls in a heatable fluidised-bed reactor, as described in EP 045 851. Further details on this method are given in WO 93/12182.

A further process for the deposition of thin metal layers which can be used in the present case for the application of the metal layer to the substrate is the known method for vapour deposition of metals in a high vacuum. It is described in detail in Vakuum-Beschichtung [Vacuum Coating], Volumes 1–5; Editors Frey, Kienel and Löbl, VDI-Verlag, 1995.

For the preparation of the lustre pigments according to the invention, matching of the high-vacuum vapour-deposition process to the substrate in powder form is absolutely necessary. To this end, it is necessary to keep the substrate uniformly in motion in the vacuum reactor during the vapour-deposition process in order to ensure homogeneous coating of all particle surfaces.

This is achieved, for example, through the use of rotating containers or the use of vibration devices.

In the sputtering process, a gas discharge (plasma) is ignited between the support and the coating material, which is in the form of plates (target). The coating material is bombarded with high-energy ions from the plasma, for example argon ions, and thus removed or atomised. The atoms or molecules of the atomised coating material are precipitated on the support and form the desired thin layer.

For sputtering processes, metals or alloys are particularly suitable. These can be atomised at comparatively high rates, in particular in the so-called DC magnetron process.

The latter is particularly preferred in the present invention for application of the metal layer to the substrate particles.

The sputtering process is described in Vakuum-Beschichtung [Vacuum Coating], Volumes 1–5; Editors Frey, Kienel and Löbl, VDI-Verlag, 1995.

For use in outdoor applications, in particular in the application in vehicle paints, the pigments according to the invention can be provided with an additional weather-stabilising protective layer, the so-called post-coating, which simultaneously effects optimum adaptation to the binder system. Post-coatings of this type have been described, for example, in EP 0 268 918 and EP 0 632 109.

Compared with PVD aluminium pigments, the pigments according to the invention have a number of advantages, which are attributable to a considerable extent to the substrates used. These effect significantly better mechanical stability, which is evident both in lower flexibility and also lower brittleness of the pigments. In addition, the pigments according to the invention can be oriented better in the application system. In addition, the ideally smooth surface of the substrate particles is retained even after their metallisation, and consequently the resultant pigments have perfect surfaces. In addition, they are so thin that they are no longer perceptible as individual particles in the application system, since undesired centres of scattering no longer occur at the edges. These advantageous properties result, in their totality, in the desired liquid metal effect being observable. In addition, the processes described for the preparation of the pigments according to the invention are simple and comparatively inexpensive to carry out.

The pigments according to the invention are compatible with a multiplicity of colour systems, preferably in the area of surface coatings, paints and printing inks. They can likewise be employed for the laser marking of paper and plastics and in ceramic materials and for applications in the agricultural sector. Owing to their particular effects, however, they are particularly suitable for the automobile sector, the printing industry and decorative cosmetics. They can likewise be employed in the preparation of pigment preparations and dry preparations which are used, in particular, in printing inks and surface coatings. A further preferred area of application is the security sector with various applications, for example in bank notes, credit cards, visas, for tax seals or the like.

Although the pigments according to the invention themselves have excellent properties, they can of course also be used in the form of a blend with a very wide variety of commercially available pigments, for example organic or inorganic dyes, conventional transparent, coloured, black or white pigments, such as, for example, metal oxide-coated mica pigments, with holographic pigments, LCPs (liquid crystal polymers) or conventional metal pigments. In addition, they can be mixed in any ratio with commercially available pigments and fillers and/or binders.

The complete disclosure content of all patent applications, patents and publications mentioned above is incorporated into this application by way of reference.

The following examples are intended to explain the invention, but without restricting it.

EXAMPLES

Example 1

100 g of bismuth oxide chloride platelets (layer thickness about 50–70 nm) are treated with 150 ml of an activation solution comprising 1.7 g of Sn(II) chloride and 10 ml of concentrated hydrochloric acid for 30 minutes. The material is then filtered off with suction and washed with demineralised water. A silver nitrate solution is prepared by dissolving 15 g of silver nitrate in 500 ml of demineralised water. 3 ml of concentrated ammonia are then added, and 0.6 g of NaOH is dissolved in this solution.

A reduction solution is prepared by dissolving 10 g of glucose in 300 ml of demineralised water. 1 ml of dilute nitric acid is added, and the mixture is made up to 500 ml with demineralised water.

For the coating, the activated bismuth oxide chloride platelets are suspended in 100 ml of demineralised water. Silver solution and reduction solution are added successively, and the reaction mixture is warmed to 50° C. with stirring.

After a reation time of one hour, the material is allowed to settle and then filtered off. After washing with water and ethanol, the silver-coated bismuth oxide chloride platelets are dried at 110° C.

Example 2

200 g of silicon dioxide platelets (layer thickness about 100 nm) are introduced into the substrate device in a high-vacuum vapour-deposition unit with magnetron cathode. After the coating chamber has been pumped out to $10^{-5}$ mmHg, argon is allowed to flow in to a pressure of $10^{-3}$ mmHg. The surface of the aluminium target is firstly cleaned by ion bombardment for 10 minutes, with a mask covering the powder. With the mask pivoted out, the coating with aluminium is subsequently carried out at a working pressure of $10^{-3}$ mmHg for a period of about 120 minutes, depending on the desired layer thickness, with constant agitation of the powder.

What is claimed is:

1. A pigment having a metallic luster, consisting essentially of a platelet-shaped, non-metallic substrate having a thickness of less than 200 nm which is completely surrounded by a metal layer having a thickness of 10–100 nm.

2. A pigment according to claim 1, where the thickness of the substrate is less than 150 nm.

3. A pigment according to claim 1, where the substrate consists of monocrystals of aluminum oxide, bismuth oxide chloride or basic lead carbonate.

4. A pigment according to claim 1, where the substrate comprises $SiO_2$ flakes, $TiO_2$ flakes or glass flakes.

5. A pigment according to claim 1, where the metal layer comprises aluminum, titanium, chromium, nickel, silver, zinc, molybdenum, tantalum, tungsten, palladium, copper, gold, platinum or an alloy thereof.

6. A process for preparing a pigment according to claim 1, comprising suspending the substrate in an aqueous and/or solvent-containing medium in the presence of a metal compound, and, after addition of a reducing agent, depositing the metal layer on the substrate.

7. A process for preparing a pigment according to claim 1, comprising coating the substrate fluidized in a fluidized bed with a metal obtained by gas-phase decomposition of a corresponding volatile metal compound.

8. A process for preparing a pigment according to claim 1, comprising depositing a corresponding metal on the substrate in a high vacuum by sputtering or thermal evaporation, with the substrate being kept uniformly in motion during the coating operation.

9. A paint, a surface coating, a printing ink, a plastic, a cosmetic formulation, a ceramic material, a glass, a paper, a dry preparation, a pigment preparation, a material for a security application, or a laser marking material comprising a pigment according to claim 1.

10. A pigment having a metallic luster, comprising a platelet-shaped, non-metallic substrate having a thickness of less than 200 nm which is completely surrounded by a metal layer, wherein the substrate comprises a monocrystal comprising aluminum oxide, bismuth oxide chloride, or a basic lead carbonate.

11. A pigment according to claim 10, wherein the substrate consists of a monocrystal of aluminum oxide, bismuth oxide chloride or basic lead carbonate.

12. A pigment according to claim 1, wherein the substrate is aluminum oxide.

13. A pigment according to claim 1, wherein the platelet-shaped substrate is in the form of particles, having a form factor greater than 20.

14. A pigment according to claim 1, wherein the platelet-shaped substrate is in the form of particles, having a form factor of 50–300.

15. A pigment according to claim 1, wherein the metal layer is aluminum or silver.

16. A pigment according to claim 1, wherein the pigment has an appearance of a liquid metal effect.

* * * * *